US009369928B2

(12) United States Patent
Song et al.

(10) Patent No.: US 9,369,928 B2
(45) Date of Patent: Jun. 14, 2016

(54) PARTIAL SESSION TRANSFER METHOD AND USER EQUIPMENT FOR THE SAME

(71) Applicant: LG Electronics Inc., Seoul (KR)

(72) Inventors: Jae Seung Song, Anyang-si (KR); Hyun Sook Kim, Anyang-si (KR)

(73) Assignee: LG ELECTRONICS INC., Seoul (KR)

(\*) Notice: Subject to any disclaimer, the term of this patent is extended or adjusted under 35 U.S.C. 154(b) by 0 days.

(21) Appl. No.: 14/727,540

(22) Filed: Jun. 1, 2015

(65) Prior Publication Data

US 2015/0282014 A1  Oct. 1, 2015

Related U.S. Application Data

(63) Continuation of application No. 12/744,667, filed as application No. PCT/KR2009/000037 on Jan. 6, 2009, now Pat. No. 9,113,377.

(60) Provisional application No. 61/019,548, filed on Jan. 7, 2008.

(30) Foreign Application Priority Data

Jul. 23, 2008 (KR) .................. 10-2008-0071435

(51) Int. Cl.
*G06F 15/16* (2006.01)
*H04W 36/00* (2009.01)
(Continued)

(52) U.S. Cl.
CPC ....... *H04W 36/0022* (2013.01); *H04L 65/1063* (2013.01); *H04L 65/1073* (2013.01);
(Continued)

(58) Field of Classification Search
CPC ................ H04W 36/0027; H04W 36/0011; H04L 80/04
USPC ........................................ 709/227
See application file for complete search history.

(56) References Cited

U.S. PATENT DOCUMENTS 6,879,600 B1  4/2005 Jones et al.
6,957,069 B2  10/2005 Shah et al.
(Continued)

FOREIGN PATENT DOCUMENTS

JP  2005-500760 A  1/2005
JP  2007-509543 A  4/2007
(Continued)

OTHER PUBLICATIONS

3GPP, "3rd Generation Partnership Project; Technical Specification Group Services and Architecture; Feasibility Study on Multimedia Session Continuity; Stage 2", Release 8, 3GPP TR 23.893, V1.0.0, Dec. 2007, pp. 1-52.

(Continued)

*Primary Examiner* — Suraj Joshi
(74) *Attorney, Agent, or Firm* — Birch, Stewart, Kolasch & Birch, LLP

(57) ABSTRACT

A method of establishing an extended IP flow in a wireless communication system can include establishing, at a user equipment (UE), an initial IP flow with a packet data network gateway (PDN-GW) included in an evolved packet core (EPC) through a first type access network and further establishing, at the UE, the extended IP flow with the PDN-GW through a second type access network different from the first type access network, while maintaining the initial IP flow with the PDN-GW through the first type access network, wherein a binding update is transmitted to the PDN-GW, wherein a binding acknowledgement is transmitted by the PDN-GW in response to the binding update if a single IP address is allocated to identify both the initial IP flow and the extended IP flow, and wherein the single IP address is included in the binding acknowledgement.

10 Claims, 3 Drawing Sheets

(51) Int. Cl.
　　　*H04L 29/06*　　　(2006.01)
　　　*H04W 60/04*　　　(2009.01)
　　　*H04W 80/04*　　　(2009.01)

(52) U.S. Cl.
　　　CPC ....... *H04L65/1089* (2013.01); *H04W 36/0011* (2013.01); *H04W 36/0027* (2013.01); *H04W 60/04* (2013.01); *H04W 80/04* (2013.01)

(56) References Cited

U.S. PATENT DOCUMENTS

| | | |
|---|---|---|
| 7,020,464 B2 | 3/2006 | Bahl et al. |
| 2006/0159047 A1 | 7/2006 | Olvera-Hernandez et al. |
| 2008/0089307 A1 | 4/2008 | Tuijn et al. |

FOREIGN PATENT DOCUMENTS

| | | |
|---|---|---|
| KR | 10-2008-0050044 A | 6/2008 |
| WO | WO 03/017689 A1 | 2/2003 |
| WO | 2005/039201 A2 | 4/2005 |
| WO | WO 2006/138736 A2 | 12/2006 |
| WO | 2008/061443 A1 | 5/2008 |

OTHER PUBLICATIONS

3GPP, "Technical Specification Group Services and System Aspects; Architecture Enhancements for non-3GPP acesses (Release 8)", 3GPP TS 23.402, V1.3.0, Sep. 2007, pp. 1-85.

3rd Generation Partnership Project, "Technical Specification Group Services and Architecture; Feasibility Study on Multimedia Session Continuity; Stage 2," Release 8, 3GPP TR 23.893, V0.4.0, Nov. 2007, 52 pages.

PARTIAL SESSION TRANSFER METHOD AND USER EQUIPMENT FOR THE SAME

CROSS-REFERENCE TO RELATED APPLICATIONS

This application is a continuation of copending U.S. application Ser. No. 12/744,667 filed on May 25, 2010, which is the National Phase of PCT/KR2009/000037 filed on Jan. 6, 2009, which claims priority under 35 U.S.C. 119(e) to U.S. Provisional Application No. 61/019,548 filed on Jan. 7, 2008 and under 35 U.S.C. 119(a) to Patent Application No. 10-2008-0071435 filed in the Republic of Korea on Jul. 23, 2008. The contents of all of these applications are hereby incorporated by reference as fully set forth herein in their entirety.

BACKGROUND OF THE INVENTION

1. Field of the Invention

The present invention relates to wireless communications, and more particularly, to a session transfer procedure not for all ongoing multimedia components but for some media components in a wireless communication system and an apparatus for the same.

2. Discussion of the Related Art

Multimedia service continuity has been introduced in 3rd generation partnership project (3GPP) release 8. The multimedia service continuity implies that, when an access network (AN) changes or a user equipment (UE) used by a user changes, an ongoing multimedia session is continued by using the changed AN or the changed UE. The multimedia service continuity is provided to use a seamless multimedia service when the UE under the multimedia service attempts access through another AN or when the user transfers media of the ongoing multimedia session to another UE.

Several scenarios have been introduced in association with the multimedia service continuity. Examples of the scenarios include 'PS-PS session continuity' which denotes multimedia session continuity when a multimedia session is transferred between different packet switched (PS) ANs, 'PS-PS session continuity in conjugation with PS-CS continuity' which denotes multimedia session continuity when media sessions on a PS domain and a circuit switched (CS) domain are transferred to one PS AN, or the other way around, and 'UE transfer' which denotes session continuity when a media component is transferred between different UEs controlled by the same user.

The scenarios in association with the multimedia service continuity may be a procedure in which all or some of the ongoing multimedia components are transferred to another AN and/or another UE. According to the 3GPP release 8, 'multimedia session transfer' or simply 'session transfer' is defined as transfer at an IP multimedia subsystem (IMS) level in session signaling paths and media paths of an ongoing session while maintaining session continuity.

The multimedia session transfer can be realized by AN transfer and/or UE transfer. The AN transfer implies a change of an AN from a UE to an IMS core, that is, a change of a network core of a radio access network (RAN) (e.g., a base station (BS)) and/or an Internet protocol-connectivity access network (IP-CAN). On the other hand, the UE transfer implies session transfer between different UEs controlled by the same user. For example, this is a case where all media components or some media components of an ongoing multimedia session are transferred to any one of the UEs to another UE.

To achieve the multimedia service continuity, there is a method employing a session anchoring mechanism using the IMS core. More specifically, a specific application server for providing the multimedia service continuity (e.g., a multimedia session continuity application server (MMSC AS)) may be installed in the IMS core so that all ongoing control signals and data signals are transmitted through the MMSC AS. Further, when there is a session transfer request, all or some media components of the ongoing multimedia session are allowed to pass through another AN with respect to the MMSC AC and/or are allowed to communicate with another UE.

Advantageously, the session anchoring mechanism using the MMSC AS can support the multimedia service continuity through session transfer without having to significantly depend on an AN type, a UE type, a media component characteristic, etc. Disadvantageously, however, the mechanism is not much effective since it is premised that control signals and data signals for session transfer are delivered up to the IMS core, i.e., the MMSC AS. An additional procedure (e.g., IMS registration) may be required.

SUMMARY OF THE INVENTION

The aforementioned multimedia service continuity can be achieved by transferring a session between an AN to be accessed to an IMS core and/or UEs under the premise that signaling is delivered to an MMSC AS, i.e., an application server of the IMS core. However, as described above, it is not effective to allow signaling to be always delivered to an IMS layer for session transfer. Therefore, if session transfer can be provided in an IP layer or lower layers of the IP layer instead of delivering the signaling to an IMS layer, the multimedia service continuity can be more effectively achieved.

For example, when the AN includes an evolved packet system (EPS), PS-PS session connectivity can be supported through a handover procedure disclosed in 3GPP TS 23.401 or 3GPP TS 23.402. Accordingly, signaling for session transfer does not have to be delivered to the MMSC AC of the IMS core. Thus, a multimedia session can be transferred between different network cores and/or between different UEs through signaling at the IP level or the lower layers of the IP layer.

However, the aforementioned multimedia service continuity needs to be provided not only when session transfer is performed for all ongoing multimedia components but also when session transfer is performed for some media components. When session transfer is performed for some media components, previous sessions for the remaining components may be released or maintained, which may differ depending on a situation. As such, when sessions for some media components are transferred to another AN and/or another UE, it is called 'partial session transfer'. The conventional handover procedure disclosed in 3GPP TS 23.401 and 3GPP TS 23.402 assumes that session transfer is performed for all ongoing multimedia components and does not consider the partial session transfer.

Accordingly, the present invention provides a session transfer procedure, whereby multimedia service continuity can be achieved even if session transfer is performed not for all ongoing multimedia components but for some media components, and a UE for the same.

The present invention also provides an effective partial session transfer procedure in an IP layer or lower layers of the IP layer without having to deliver signaling to an IMS layer, and a UE for the same.

According to an aspect of the present invention, a partial session transfer method for a user equipment establishing a first session to transmit a plurality of media components is provided. The method includes: transmitting a partial attach request message to a mobility control entity of a network core; receiving an attach accept message including information regarding a gateway of the network core from the mobility control entity; establishing a second session with the gateway by using the gateway information; and transmitting partial session transfer information indicating a media component to be transmitted using each of the first session and the second session among the plurality of media components.

In the aforementioned aspect of the present invention, After the establishing of the second session, the first session may not be released but maintained without alteration. In addition, the plurality of media components may be exchanged with a counterpart user equipment through each of the first session and the second session on the basis of the partial session transfer information.

According to another aspect of the present invention, there is provided a user equipment including a processor configured to generate and process a message, and a first transceiver and a second transceiver, each of which is operatively connected to the processor to transmit the message for the processor. The user equipment establishes a first session for transmitting a plurality of media components through the first transceiver. The processor is configured to generate a partial attach request message and deliver the partial attach request message to the second transceiver. The second transceiver is configured to transmit the delivered partial attach request message to a mobility control entity of a network core, receive an attach accept message containing information regarding a gateway of the network core from the mobility control entity, and deliver the attach accept message to the processor. The processor is configured to establish a second session passing through the gateway and the second transceiver by using the gateway information, generate partial session transfer information indicating a media component to be transmitted using each of the first session and the second session among the plurality of media components, and deliver the partial session transfer information to the first transceiver and/or the second transceiver. The first transceiver and/or the second transceiver are configured to transmit the delivered partial session transfer information to a counterpart user equipment.

According to exemplary embodiments of the present invention, a partial session transfer procedure is provided so that a seamless multimedia service can be provided for a user equipment supporting a dual mode operation even if session transfer is performed not for all multimedia components but for some media components. In particular, the partial session transfer procedure is achieved through signaling in an Internet protocol (IP) layer or lower layers of the IP layer, and thus there is no need to transmit a control signal up to an IP multimedia subsystem (IMS) layer. Therefore, unnecessary signaling up to the IMS layer can be decreased, and an unnecessary procedure (e.g., registration procedure) can be omitted in an IMS stage.

DETAILED DESCRIPTION OF THE INVENTION

Hereinafter, exemplary embodiments of the present invention will be described in detail with reference to the accompanying drawings.

Figure 1:
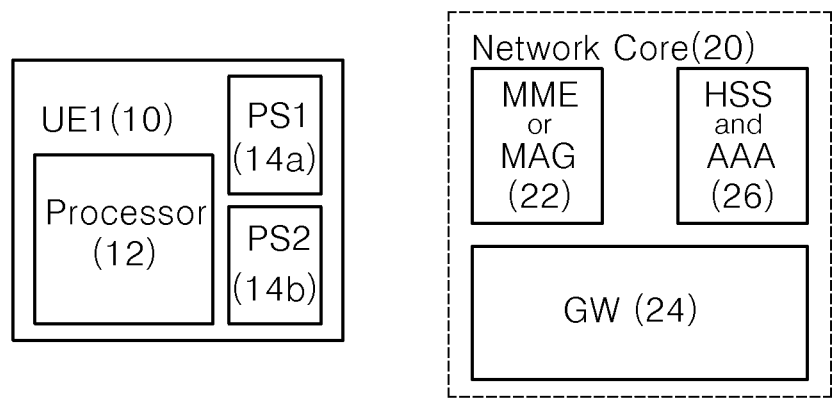
FIG. 1 is a schematic block diagram showing a structure of a wireless communication system to explain a partial session transfer procedure according to an embodiment of the present invention.

FIG. 1 is a schematic block diagram showing a structure of a wireless communication system to explain a partial session transfer procedure according to an embodiment of the present invention.

Referring to FIG. 1, a wireless communication system includes a user equipment (UE) 10 and a network code 20. A radio access network (RAN) is provided for communication between the UE 10 and the network core 20. Although communication between the UE 10 and the network core 20 is achieved via the RAN, the RAN is not shown in FIG. 1 for convenience of explanation. The structure of the RAN may differ according to a characteristic or type of the UE 10 and/or the network core 20. Since the detailed structure is irrelevant to the present embodiment, descriptions thereof will be omitted.

The UE 10 is an apparatus for performing communication with a plurality of network nodes and/or another UE through an RAN (e.g., an evolved-UMTS terrestrial radio access network (E-UTRAN)), and the term is not particularly limited thereto. For example, the UE 10 may also be referred to as a mobile station (MS), a user terminal (UT), a subscriber station (SS), a wireless device (or a wireless station), etc. The UE 10 may be mobile or fixed.

The UE 10 includes a processor 12 as a mean for signal generation and processing and transceivers 14a and 14b for transmitting/receiving a radio signal through the RAN. Although not shown, the UE 10 may further include a memory for storing user data or programs, a display unit for displaying a variety of information or data of the UE, and a user interface (e.g., a keypad, a touch screen, etc.).

The UE 10 may support a multi-mode operation. For this, the UE 10 includes at least two transceivers 14a and 14b. In a case where the UE 10 includes a plurality of transceivers 14a and 14b, the processor 12 operatively connected to the transceivers 14a and 14b also supports their operations. Further, the processor 12 receives or delivers signals from each of the transceivers 14a and 14b. As shown in FIG. 1, the processor 12 and the transceivers 14a and 14b may be devices PS1 and PS2 devised to support packet switched (PS) communications.

The network core 20 includes a plurality of network nodes constituting a core of a PS communication system. The network core 20 may consist of network nodes of the PS communication system, such as an evolved packet core (EPC). The EPC may be a general packet radio service (GPRS) system, a universal mobile telecommunications system (UMTS), or a 3rd generation partnership project (3GPP) long term evolution (LTE) system. Only minimum possible network nodes are shown in FIG. 1 for description purposes, and thus the structure of the network core 20 is not limited to the constitutional elements shown in FIG. 1.

The network core 20 includes a mobility control entity (i.e., a mobility management entity (MME) or a media access gateway (MAG)) 22 and a gateway (GW) 24. The mobility control entity 22 performs several functions of a control plane, for example, for processing a control signal when an attach request or a handover request is made from the UE. Further, the mobility control entity 22 performs functions such as evolved packet system (EPS) bearer, Internet protocol (IP) tunnel establishment, mobility management, etc. The mobility control entity 22 may be an MME of an enhanced universal mobile telecommunication system (E-UMTS) or an MAG, but this is for exemplary purposes only. The MAG is a network node defined in the Internet engineering task force (IETF) to use a proxy mobile Internet protocol (PMIP) which is a protocol related to mobility management of an IP level and user data transmission. The MAC includes not only a mobility control plane but also a user data plane.

The GW 24 is a network node that performs an input/output port function to communicate with an external packet data network in the network core 20. According to a specific attach procedure or a handover procedure, the UE 10 establishes an EPS bearer or an IP tunnel with up to the GW 24 through the RAN. According to the embodiment of the present invention, the GW 24 also performs a function of releasing a pre-established multimedia session and/or a session integration function. The GW 24 may be a packet data network gateway (PDN GW) that is an edge gateway for accessing to an external packet data network from the EPC.

The network core 20 may further include a home subscriber sever (HSS) and an authentication, authorization, and accounting (AAA) server 26. The HSS is a network node including a database containing subscriber information regarding a wireless communication system. The AAA server is an authentication-related server that allows the UE to access to a network node constituting the network core 20 and that provides control by storing records such as a location of the UE. Although the HSS and the AAA 26 are depicted as one block in FIG. 1, this is for explanation purposes only. The HSS and the AAA 26 are logically identifiable functional entities. Physically, the HSS and the AAA 26 may be implemented into one element or may be separately implemented.

Next, a partial session transfer procedure using the wireless communication system of FIG. 1 according to an embodiment of the present invention will be described.

Figure 2:
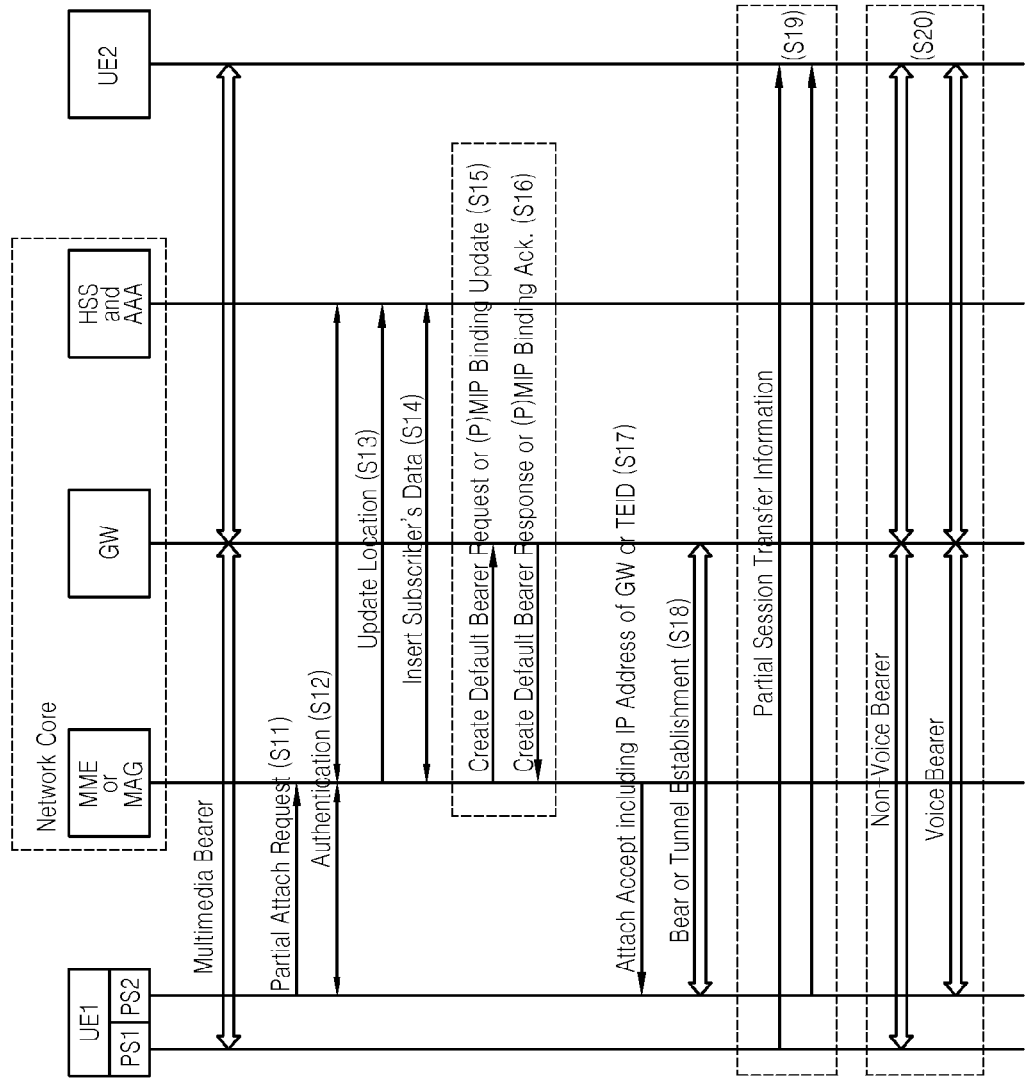
FIG. 2 is a message flow diagram of a partial session transfer procedure according to a first embodiment of the present invention.

FIG. 2 is a message flow diagram of a partial session transfer procedure according to a first embodiment of the present invention. In FIG. 2, a first UE (i.e., UE1) supporting a dual mode operation is currently providing an IMS multimedia service by establishing a first multimedia session with a second UE (i.e., UE2) by the use of a first transceiver (i.e., PS1). To indicate the established first multimedia session, in FIG. 2, a multimedia bearer or an evolved packet system (EPS) bearer is provided between the PS1 of the UE1 and a GW. A specific bearer or tunnel is also provided between the GW and the UE2. The IMS multimedia service supports communication of a plurality of media components (i.e., voice and non-voice media).

Referring to FIG. 2, the UE1 transmits a partial attach request message to a network core, more specifically, a mobility control entity (i.e., MME or MAG) of the network core, through a second transceiver (i.e., PS2) (step S11). The mobility control entity may be the MME or the MAG. There is no restriction on reasons for the UE1 to transmit the partial attach request message UE1 through the PS2. For example, the UE1 may transmit the partial attach request message through the PS2 when the UE1 recognizes that the PS2 is available while using a multimedia service through the PS1 and also when the UE1 determines that it is further effective to transfer some media components (e.g., voice media) of the multimedia service to the PS1. In this case, which media corresponds to a media component to be used in determination of effectiveness and to be a subject of transfer is irrelevant to the embodiment of the present invention.

The partial attach request message is a message for requesting access from the UE1 PS2 to the network core for partial session transfer. There is no restriction on a format of the partial attach request message. For example, the partial attach request message may be an Attach Request including information regarding an attach type which is set to a value indicating 'partial handover'. The Attach Request with such a format has an advantage in that the attach type is distinguished from a previous Attach Request whose attach type is set to 'initial attach' or 'handover'. In addition, since it is sufficient to additionally provide only an attach type of 'partial handover', the previous Attach Request can be used without alteration. Several network nodes (e.g., MME (or MAG), GW, HSS, AAA, etc.) constituting the network code adaptively perform operations according to the attach type information contained in the Attach Request.

Upon receiving the partial attach request message from the PS2 of the UE2, the mobility control entity (i.e., MME or MAG) performs an authentication procedure on the UE1 by accessing an HSS and an AAA (step S12). A detailed process of the authentication procedure may differ according to a type of the network core and/or a radio access network (RAN), and is performed according to a typical procedure.

After successfully performing the authentication procedure, the mobile control entity (i.e., MME or MAG) performs a location update procedure (step S13). The location update procedure is performed when the mobility control entity (i.e., MME or MAG) accessing through the PS2 is different from a previously used entity, that is, a mobility control entity accessing through the PS1.

After performing the location update procedure, the mobility control entity (i.e., MME or MAG) performs a procedure for obtaining subscriber's data from the HSS (step S14). For this, the HSS delivers the subscriber's data to the mobility control entity. In this case, the subscriber's data contains information regarding all access point names (APNs) usable by the UE1 together with information regarding the GW, i.e., an IP address of the GW. Through such a procedure, the HSS and the AAA assign a GW for the UE1 PS2 and report information thereon to the mobility control entity (i.e., MME or MAG).

If the attach type is 'partial attach', the same GW as that previously assigned for the UE1 PS1 can be assigned for the UE1 PS2. This is possible because the HSS and the AAA have information regarding the GW currently assigned to the UE1 PS1. However, the embodiment of the present invention is not limited thereto, and thus the GW assigned for the UE1 PS2 may be a new GW different from the previous GW. In this case, the IP address of the newly assigned GW and information thereon are stored in the HSS and the AAA, which will be described below with reference to FIG. 3. The mobility control entity (i.e., MME or MAG) also updates information regarding the UE1 PS2 newly added to the context of the previous UE1.

Next, a procedure for establishing a new bearer or tunnel for partial session transfer is performed between the mobility control entity (i.e., MME or MAG) and the GW (steps S15 and S16).

For this, the mobility control entity transmits a bear establishment request message or a tunnel establishment request message to the GW via a serving GW (step S15). The bearer establishment request message may be Create Default Bearer Request. The tunnel establishment request message may be (P)MIP Binding Update. These message types are for exemplary purposes only.

In response thereto, the GW transmits a bear establish response message or a tunnel establish response message to the mobility control entity (step S16). The bear establish response message may be Create Default Bearer Response. The tunnel establish response message may be (P)MIP Binding Ack. Together with acknowledgment or non-acknowledgment on the received request message, the response message includes a tunnel endpoint identifier (TEID) or an IP address of a network node for reporting the GW that is an end point of a tunnel or a newly established bearer.

As such, a variety of information determined by the HSS is included in the response message transmitted in step S16. In particular, for a new partial session of the UE1, information (e.g., GW IP information) regarding a GW assigned for the UE1 PS2 is included. As in the present embodiment, the GW information may be IP information of the same GW as that previously used by the UE1 PS1, or as described below, may be IP information of a newly assigned GW different from the previous GW.

Subsequently, the mobility control entity (i.e., MME or MAG) transmits Attach Accept to the UE1 (step S17). The Attach Accept includes a TEID or an IP address of a network node for establishing an EPS bearer or an IP tunnel. More specifically, the Attach Accept is transmitted from the mobility control node to the UE1 PS2 through the RAN, whereas the IP address or the TEID included in the Attach Accept are transmitted up to a node of the RAN.

Next, a radio bear establishment procedure is performed between the UE1 PS2 and the RAN, and a bear or tunnel establishment procedure is performed between the RAN and the GW, so that a new session (e.g., a new EPS bearer or an IP tunnel) is established between the UE1 PS2 and the GW (step S18). According to the embodiment of the present invention, the UE1 PS1 maintains a previous EPS bearer or IP tunnel (e.g., a previously established multimedia bearer before step S11 of FIG. 2) established with the GW instead of releasing the previous EPS or IP tunnel. This is because, according to the embodiment of the present invention for partial session transfer, only some of media components are transmitted through a newly established EPS bearer or IP tunnel, and the remaining media components are transmitted through the previous EPS bearer.

Subsequently, although not shown, a GW which has established a new EPS bearer with the UE1 PS2 performs a new bearer or tunnel establishment procedure with a counterpart UE (i.e., UE2) and/or a wireless communication system (i.e., network core, RAN, etc.) including the counterpart UE (i.e., UE2). Such a procedure is performed according to a typical bearer establishment procedure, and thus detailed descriptions thereof will be omitted. However, if the GW is the same as the GW which has established the EPS bearer with the UE1 PS1, a new EPS bearer or IP tunnel establishment procedure between the GW and the UE2 can be omitted.

As such, when the new bearer or tunnel establishment procedure is completed between the UE1 PS2 and the GW, the UE1 has two EPS bears and/or IP tunnels that can be used by up to the GW. In this case, the UE1 determines a media component to be transmitted through a newly established bearer (or tunnel) independently from the multimedia components through the partial session transfer, or determines media components to be transmitted through the two bearers (or tunnels), respectively, among the multimedia components. For example, among the multimedia components, the UE1 may make a decision so that non-voice media is exchanged through a previous bearer, i.e., a bearer (or tunnel) established through the UE1 PS1, and voice media is exchanged through a newly established bearer, i.e., a bearer (or tunnel) established through the UE1 PS2.

Further, the UE1 delivers information containing such a decision result, i.e., partial session transfer information, to a counterpart UE (i.e., UE2), a network core of the counterpart UE (i.e., UE2), or an entity for providing a multimedia service. Alternatively, the UE1 delivers the information to the counterpart UE (i.e., UE2) and a wireless communication system of the counterpart UE (i.e., UE2) including an entity for providing a service (step S19). There is no restriction on a method of delivering the partial session transfer information by the UE1 to the counterpart UE (i.e., the UE2). For example, the UE1 may deliver the partial session transfer information to the UE2 by using only the previous bearer or the newly established bearer or by using both of the two established bearers.

Referring continuously to FIG. 2, the UE1 exchanges multimedia data with the GW through the established two EPS bearers or IP tunnels (step S20). As described above, in the present embodiment, since the same GW is assigned to the UE1 PS1 and the UE1 PS2, multimedia data transmission performed in step S20 is also achieved through the same GW. However, similarly to a second embodiment of the present invention to be described below with reference to FIG. 3, when different GWs are assigned to the UE1 PS1 and the UE1 PS2, multimedia data transmission is also achieved through the different GWs.

In this step, a media component to be transmitted through each EPS bearer or IP tunnel is determined according to partial session transfer information previously transmitted to the counterpart UE. For example, according to the partial session transfer information delivered in step S19, non-voice data may be exchanged through the previous EPS bearer (i.e., the EPS bearer established through the UE1 PS1), and voice data may be exchanged through the newly established EPS bearer (i.e., the EPS bearer established through the UE1 PS2). Multimedia data is transmitted through any path (e.g., a pre-established bearer or two bearers) from the GW to the counterpart UE (i.e., UE2). Although it is shown in FIG. 2 that the non-voice data and the voice data are transmitted through separate bearers, this is for exemplary purposes only.

Figure 3:
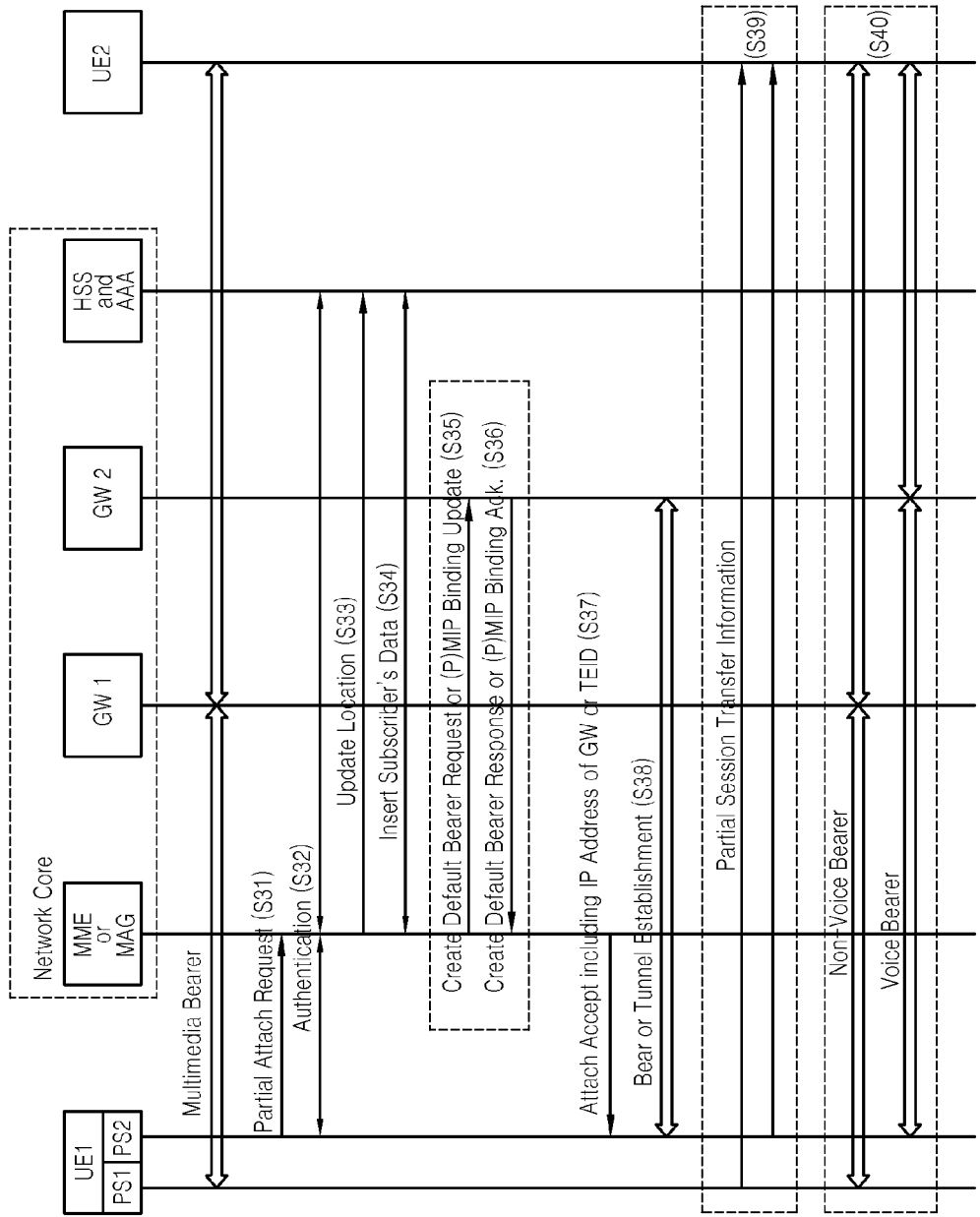
FIG. 3 is a message flow diagram of a partial session transfer procedure according to a second embodiment of the present invention.

FIG. 3 is a message flow diagram of a partial session transfer procedure according to a second embodiment of the present invention. In the present embodiment, a GW newly assigned for a UE1 PS2 for establishing a new multimedia bearer with a UE2 through partial session transfer is the same as the first embodiment expect that the GW is a second GW (i.e., GW2) which is different from a first GW (i.e., GW1) previously assigned for the UE1 PS1. Hereinafter, the second embodiment will be described in brief by focusing on the first embodiment described above with reference to FIG. 2. The first embodiment can be equally applied unless specified otherwise in detail in the present embodiment.

Similarly to the first embodiment, in the second embodiment, a first UE (i.e., UE1) supporting a dual mode operation is currently providing an IMS multimedia service by establishing a first multimedia session with a second UE (i.e., UE2) by the use of a first transceiver (i.e., PS1). To indicate the established first multimedia session, in FIG. 3, a multimedia bearer or an evolved packet system (EPS) bearer is provided between the PS1 of the UE1 and the first GW (i.e., GW1). A specific bearer or tunnel is also provided between the GW1 and the UE2. The IMS multimedia service supports communication of a plurality of media components (i.e., voice and non-voice media).

Referring to FIG. 3, the UE1 transmits a partial attach request message to a network core, more specifically, a mobility control entity (i.e., MME or MAG) of the network core, through a second transceiver (i.e., PS2) (step S31). The partial attach request message is a message for requesting access from the UE1 PS2 to the network core for partial session transfer. There is no restriction on a format of the partial attach request message. For example, the partial attach request message may be Attach Request including information regarding an attach type which is set to a value indicating 'partial handover'.

Upon receiving the partial attach request message from the PS2 of the UE2, the mobility control entity (i.e., MME or MAG) performs an authentication procedure on the UE1 by accessing to an HSS and an AAA (step S32). After successfully performing the authentication procedure, the mobile control entity (i.e., MME or MAG) performs a location update procedure (step S33). Subsequently, the mobility control entity (i.e., MME or MAG) performs a procedure for obtaining subscriber's data from the HSS (step S34). The subscriber's data contains information regarding all access point names (APNs) usable by the UE1 together with information regarding the GW, i.e., an IP address of the second GW (i.e., GW2). Through such a procedure, the HSS and the AAA assign the GW2 that is a GW for the UE1 PS2 and report information thereon to the mobility control entity (i.e., MME or MAG). As such, in the present embodiment, the GW2 which is a different GW from the GW1 previously assigned for the UE1 PS1 is assigned for the UE1 PS2.

Next, a procedure for establishing a new bearer or tunnel for partial session transfer is performed between the mobility control entity (i.e., MME or MAG) and the GW2 (steps S35 and S36). For this, the mobility control entity transmits a bear establishment request message or a tunnel establishment request message to the GW2 via a serving GW (step S35). In response thereto, the GW2 transmits a bear establish response message or a tunnel establish response message to the mobility control entity through the serving GW (step S36). Together with acknowledgement or non-acknowledgment on the received request message, the response message includes a TEID or an IP address of a network node for reporting the GW2 that is an end point of a tunnel or a newly established bearer. As described above, the TEID or the IP address of the GW2 may be different from the TEID or the IP address of the GW1.

Subsequently, the mobility control entity (i.e., MME or MAG) transmits Attach Accept to the UE1 (step S37). The Attach Accept includes a TEID or an IP address of the GW2 that is a network node for establishing an EPS bearer or an IP tunnel. Then, a radio bear establishment procedure is performed between the UE1 PS2 and the RAN, and a bear or tunnel establishment procedure is performed between the RAN and the GW2, so that a new session (e.g., a new EPS bearer or an IP tunnel) is established between the UE1 PS2 and the GW2 (step S38). According to the embodiment of the present invention, the UE1 PS1 maintains a previous EPS bearer or IP tunnel (e.g., a previously established multimedia bearer before step S31 of FIG. 3) established with the GW1 instead of releasing the previous EPS or IP tunnel.

Further, the UE1 delivers information containing a decision result on a type of a media component to be transmitted through each EPS bearer, i.e., partial session transfer information, to a counterpart UE (i.e., UE2), a network core of the counterpart UE (i.e., UE2), or an entity for providing a multimedia service. Alternatively, the UE1 delivers the information to the counterpart UE (i.e., UE2) and a wireless communication system of the counterpart UE (i.e., UE2) including an entity for providing a service (step S39). There is no restriction on a method of delivering the partial session transfer information by the UE1 to the counterpart UE (i.e., the UE2). For example, the UE1 may deliver the partial session transfer information to the UE2 by using only the previous bearer or the newly established bearer or by using both of the two bearers.

Referring continuously to FIG. 3, the UE1 exchanges multimedia data with the UE2 by using the established two EPS bearers or IP tunnels through the GW1 and the GW2, respectively (step S40). As described above, in the present embodiment, since different GWs are assigned to the UE1 PS1 and the UE1 PS2, the UE1 PS1 and the UE1 PS2 respectively transmit different media components through the GW1 and the GW2. In the multimedia data, types of media components transmitted through the respective GWs can be divided corresponding to the partial session transfer information delivered in step S39.

Although the present invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A method of establishing an extended IP flow in a wireless communication system, comprising:
   establishing, at a user equipment (UE), an initial IP flow with a packet data network gateway (PDN-GW) included in an evolved packet core (EPC) through a first type access network; and
   further establishing, at the UE, the extended IP flow with the PDN-GW through a second type access network different from the first type access network, while maintaining the initial IP flow with the PDN-GW through the first type access network,
   wherein a binding update is transmitted to the PDN-GW,
   wherein a binding acknowledgement is transmitted by the PDN-GW in response to the binding update if a single IP address is allocated to identify both the initial IP flow and the extended IP flow, and
   wherein the single IP address is included in the binding acknowledgement.

2. The method of claim 1, wherein the initial IP flow includes a first session, and the extended IP flow includes a second session.

3. The method of claim 1, wherein the initial IP flow and the extended IP flow are associated with a same service.

4. The method of claim 1, wherein the binding update is triggered by an attach request message transmitted from the UE.

5. The method of claim 4, wherein the single IP address is delivered to the UE through a mobility management entity (MME) via an attach accept message, which is configured in response to the attach request message.

6. A user equipment for establishing an extended IP flow in a wireless communication system, comprising:
   a radio frequency (RF) unit configured to transmit or receive a signal; and
   a processor coupled to the RF unit and configured to:
   instruct the RF unit to establish an initial IP flow with a packet data network gateway (PDN-GW) included in an evolved packet core (EPC) through a first type access network; and
   instruct the RF unit to further establish the extended IP flow with the PDN-GW through a second type access network different from the first type access network, while maintaining the initial IP flow with the PDN-GW through the first type access network,
   wherein a binding update is transmitted to the PDN-GW, wherein a binding acknowledgement is transmitted by the PDN-GW in response to the binding update if a single IP address is allocated to identify both the initial IP flow and the extended IP flow, and wherein the single IP address is included in the binding acknowledgement.

7. The user equipment of claim 6, wherein the initial IP flow includes a first session, and the extended IP flow includes a second session.

8. The user equipment of claim 6, wherein the initial IP flow and the extended IP flow are associated with a same service.

9. The user equipment of claim 6, wherein the binding update is triggered by an attach request message transmitted from the UE.

10. The user equipment of claim 9, wherein the single IP address is delivered to the UE through a mobility management entity (MME) via an attach accept message, which is configured in response to the attach request message.

* * * * *